June 26, 1956  W. A. HARPER  2,752,022
DUAL CLUTCH ARRANGEMENT
Original Filed July 11, 1950  2 Sheets-Sheet 1
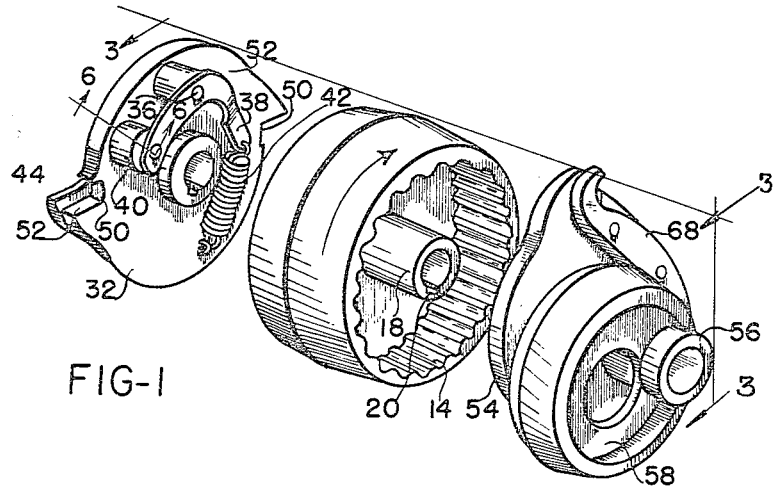
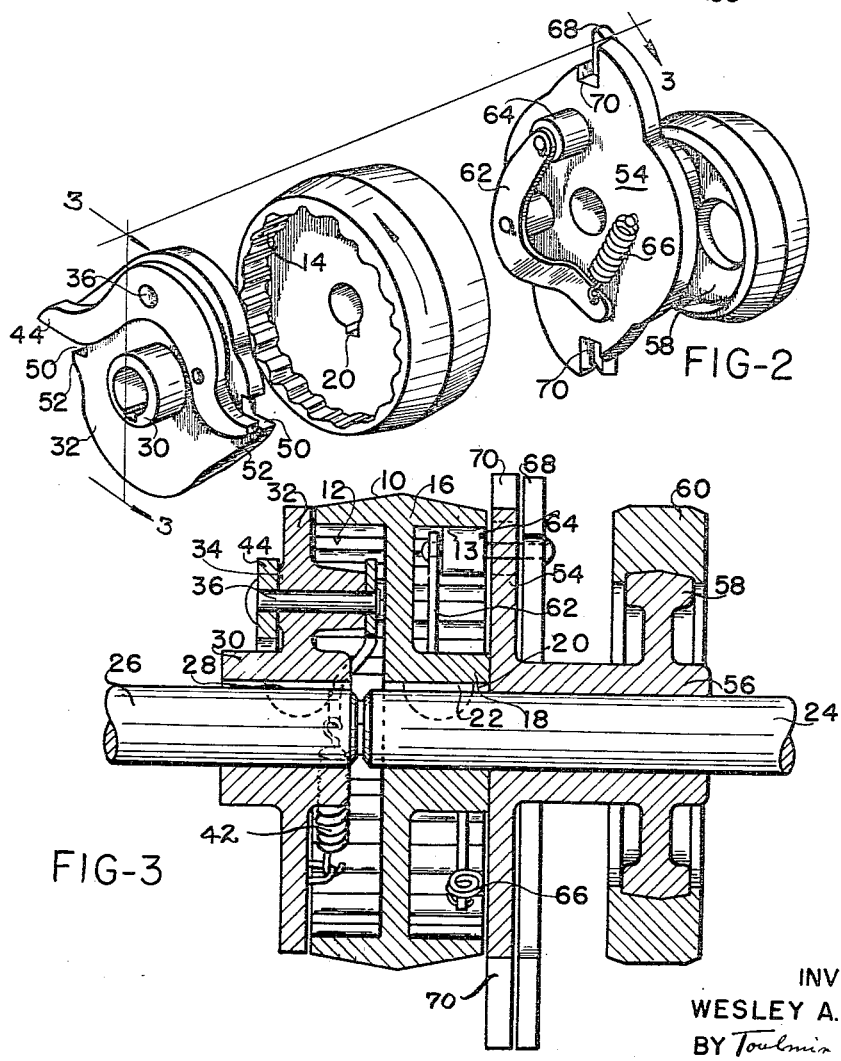
INVENTOR
WESLEY A. HARPER
BY Toulmin & Toulmin
ATTORNEYS

United States Patent Office 2,752,022
Patented June 26, 1956

2,752,022
DUAL CLUTCH ARRANGEMENT

Wesley A. Harper, Bellevue, Ohio, assignor, by mesne assignments, to Cockshutt Farm Equipment Limited, a corporation of Canada Original application July 11, 1950, Serial No. 173,212. Divided and this application November 2, 1951, Serial No. 254,539

7 Claims. (Cl. 192—23)

This invention relates to a clutch particularly to a dual clutch, and especially to such clutches adapted for use in connection with grain drills and similar devices, and to actuating means therefor. This application is a division of my co-pending application, Serial No. 173,212, filed July 11, 1950.

In many instances there are two functions of a machine which it is desired to integrate, at least as far as the starting and stopping thereof is concerned. One particular case in point is that of a grain drill of the usual type which includes furrow openers that are adapted for being raised to an idle position or lowered to a working position and having associated therewith feeders which it is desired to have operated when the furrow openers are lowered and to have idle when the furrow openers are raised.

The particular object of the present invention is to provide a novel clutch construction for an arrangement as referred to above such that the operation of the feeders is positively synchronized with the raising and lowering of the furrow openers.

A still further object is the provision of a dual clutch arrangement which is extremely compact and simple in construction.

Another object is the provision of a dual clutch arrangement and integrated operating or control members therefore so that the operation of the two clutches is synchronized.

Another object of this invention is to provide, in a single assembly, a plurality of limited revolution clutches, the operation of which is integrated so they can operate as a unit.

These and other objects and advantages will become more apparent upon reference to the following description taken in connection with the accompanying drawings in which:

Figure 1 is a perspective view showing the new clutch according to my invention from one side;

Figure 2 is a view like Figure 1, but shows the clutch from the other side;

Figure 3 is a vertical section taken through the clutch and is indicated by the cutting planes 3—3—3 on Figures 1 and 2;

Figure 4:
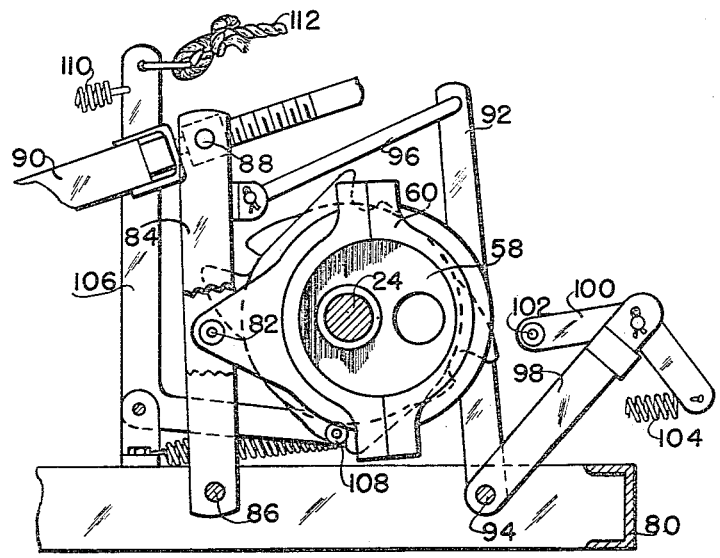
Figure 4 is a side view taken through the combination of the clutch according to my invention and the operating and control elements therefor looking in at the same end of the clutch as is seen in Figure 1.
Figure 5:
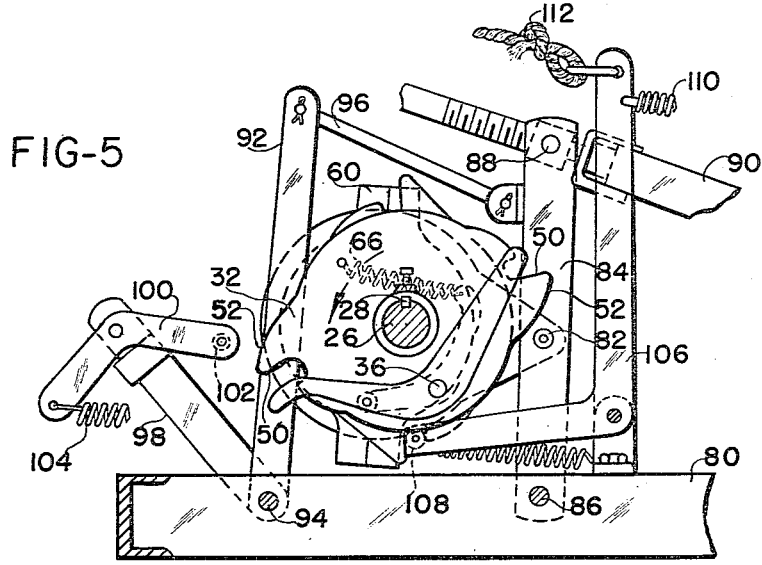
Figure 5 is a view like Figure 4, but is taken from the opposite side of the clutch.

Referring to the drawings somewhat more in detail, particularly Figures 1, 2 and 3, the clutch, according to my invention, comprises a main body part 10 formed with a recess in each side as indicated at 12 and 13 and which recesses are provided with the axially extending arcuate grooves 14, best seen in Figures 1 and 2.

The clutch body also comprises the central plate 16 separating the recesses 12 and 13 and a hub 18 at the center portion of the central plate that is formed with a keyway 20 for receiving key 22 that keys the body part 10 to an input shaft 24.

In axial alignment with shaft 24 is a driven shaft 26 keyed by a key 28 to hub 30 of a plate 32 that overlays recess 12. Plate 32 is formed with a boss 34 through which extends a pin 36. On its inner end, that is within the recess 12, pin 36 carries an arm 38 having a roller 40 on one end thereof adapted for engagement with the axial grooves 14 in recess 12 for establishing a driving connection between the body of the clutch and plate 32 thereby to establish a driving connection from input shaft 24 to output shaft 26.

A tension spring 42 connects between a fixed point on plate 32 and the end of arm 38 opposite roller 40 and serves continuously to urge the arm in a direction to engage the roller with the said grooves.

Figure 6:
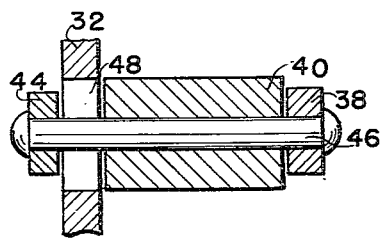
Figure 6 is a detailed sectional view indicated by line 6—6 on Figure 1.

Arm 38 is adapted for being actuated for selectively disengaging roller 40 from the grooves in recess 12 by means of an arm 44 mounted externally of plate 32 and also connected with pin 36. As will be seen in Figure 6, arm 44 is also connected with arm 38 by means of the pin 36 that provides support for roller 40, and which latter pin extends through a slot 48 in plate 32.

The periphery of plate 32 is formed with the oppositely disposed notches 50 and across which the ends of arm 44 extend when the arm is influenced by spring 42. Notches 50 are formed with trailing sides as in 52 which extend outwardly a greater radial extent than the leading sides of the said notches and for a purpose which will become more apparent hereinafter.

Positioned over recess 13 of body 10 is a plate 54 that is freely rotatable on shaft 24 and which has integral therewith a hub extension 56 that carries an eccentric 58 adapted for being rotatably received within an eccentric shoe 60.

Plate 54 has pivoted thereto an inner arm 62 carrying a roller 64 and a spring urged by a spring 66 to move the roller into engagement with the axial grooves in recess 13.

Plate 54 also has an arm 68 externally of the plate connected with arm 62 and having end portions that extend across slot 70 in the periphery of the said plate. The arrangement of the internal and external arms associated with plate 54 and the mode of operation thereof is identical with that described in detail in connection with plate 32.

Turning now to Figures 3 and 4, the clutch arrangement which is described is shown mounted in the frame 80 of a machine with the eccentric shoe 60 connected by a pin 82 with a lever arm 84 that is pivoted in frame 80 by pivot pin 86. At its upper end lever arm 84 is connected by a pin 88 with a member 90 adapted for doing work when it is reciprocated.

On the opposite side of the clutch assembly is an arm 92 pivoted in frame 80 at 94 and connected with arm 84 by link 96 so the two arms will swing together. Arm 92 comprises an angular projection 98 that moves with the said arm and pivoted on the end of projection 98 is a crank arm 100 having a roller 102 at one end and a tension spring 104 connected with the other end.

Roller 102 is so positioned that when it is moved inwardly by counter-clockwise rotation of arm 92 and projection 98 thereof from their Figure 4 position, the said roller will bear against the periphery of plate 32 that is associated with the driven shaft 26.

On the same side of the clutch assembly for arm 84 is pivoted a bell crank lever 106 carrying a roller 108 at one end and having its other end spring urged by spring 110 in a direction to urge the roller toward the clutch assembly. Roller 108 is so positioned that it will bear against the periphery of plate 54 that is associated with eccentric 58. The upper end of bell crank 106 also has connected therewith a pull rope 112 by means of which the bell crank can be rotated by its pivot to disengage the roller 108 from the periphery of plate 54.

In general, the described arrangement places the one part of the dual clutch assembly comprising plate 54 and eccentric 58 under the control of bell crank lever 106 and which bell crank lever is manually operable. The other portion of the dual clutch assembly which comprises plate 32 and driven shaft 26, is under the control of arm 92, extension 98 thereof, crank arm 100 and roller 102, and these controlling elements are, in turn, under the control of arm 84 by virtue of the connecting link 96.

In operation, with the parts of the device in the position they occupy in Figure 4, roller 108 is engaged with a notch 70 of plate 54 and is thus in engagement with one end of arm 68 so as to hold roller 64 out of engagement with the grooves in recess 13 thereby holding plate 54 and eccentric 58 stationary while permitting free rotation relative thereto of shaft 24 and clutch body 10.

With eccentric 58 in its Figure 4 position, arm 84 is held in its right-hand position and this, in turn, holds arm 92 and the parts connected therewith, in such position that roller 102 is spaced outwardly from the periphery of plate 32. Plate 32 is therefore engaged with body 10 of the clutch and rotates therewith thereby driving output shaft 26. In the actual machine with which the clutch is associated, the Figure 4 position of arm 84 and its connected actuating member 90 correspond to the lowered working position of the furrow openers of a grain drill and the driving of shaft 26 in the described manner causes seed or fertilizer or both to be fed to the furrow openers.

If the pull rope 112 is now actuated, bell crank lever 106 is turned about its pivotal support to move its roller 108 out of the notch 70 in which it is resting thereby releasing arms 62 and 68 so that roller 62 engages the periphery of recess 13. This establishes a driving connection between body 10 of the clutch and plate 54 which drives plate 54 and connected eccentric 58. By the time the clutch body has made a half revolution, pull rope 112 has been released and spring 110 will cause roller 108 to drop into the opposite notch 70 and again to disengage plate 54 from clutch body 10.

During this half revolution of plate 54 and eccentric 58, arm 84 is actuated in a counterclockwise direction as viewed in Figure 4 and through link 96 this movement of arm 84 moves arm 92 and its connected parts to bring roller 102 into engagement with the periphery of the plate 32. As soon as plate 32 rotates far enough to bring one of its notches 50 into alignment with roller 102, the said roller will drop into the notch and actuate the arms 44 and 38 to disengage roller 40 from the periphery of recess 12 thereby effecting disengagement of the driving connection between clutch body 10 and plate 32. This brings output shaft 26 to a halt and stops operation of the feeding devices.

Whenever pull rope 112 is again actuated, the eccentric 58 will return to its Figure 4 position and the output shaft 24 will again be driven.

In the foregoing, it will be evident that what I have provided by the present invention is an extremely compact and simple dual clutch arrangement and coordinated controls therefor such that the one portion of the clutch is always under control of the members actuated by the other portion of the clutch. It will be evident that while half-revolution clutches have been shown, the clutches could be arranged to make a complete revolution or any one fractional part thereof desired. It will also be evident that while the clutch arrangement of my invention has been described in connection with a grain drill, and may, perhaps, find its best use in connection with a device of this type, it is not intended to limit this invention solely to use in connection with this particular mechanism.

It will be understood that this invention is susceptible to modification in order to adapt it to differenet usages and conditions, and, accordingly, it is desired to comprehend such modifications within this invention as may fall within the scope of the appended claims.

I claim:

1. In a dual clutch arrangement; a rotary housing forming a driving clutch member, two driven clutch plate members adapted for being driven by the housing, an element carried by each plate resiliently urged toward driving engagement with the housing, means for selectively clutching one of said driven plate members to the housing, means for automatically unclutching the said one member from the housing upon movement of the said one member a predetermined amount, mechanism driven by said one member, and means actuated by said mechanism operable alternately to clutch and unclutch said second driven member and said housing upon successive cycles of movement of said first driven member.

2. In a dual clutch arrangement; a rotary housing forming a driving clutch member, two driven clutch plate members adapted for being driven by the housing, an element carried by each plate resiliently urged toward driving engagement with the housing, means for selectively clutching one of said driven plate members to the housing, means for automatically unclutching the said one member from the housing upon movement of the said one member a predetermined amount, mechanism driven by said one member, and means actuated by said mechanism operable alternately to clutch and unclutch said second driven member and said housing upon successive cycles of movement of said first driven member, said driven members having detent means operable to lock the said members stationary when they are unclutched from the said housing.

3. In a dual clutch; a rotary housing, a plate on each side of the housing, an element carried by each plate resiliently urged toward driving engagement with the housing, notch means in the periphery of each plate, an arm on each plate connected with the said element of the same plate and overlying the notch means in the plate when the element is in driving position and moving the element out of driving position when shifted to one side of the notch means, a first roller resiliently urged toward the periphery of one of the said plates so as to enter the notch means thereof and automatically unclutch the said plate from the housing, a second roller shiftable toward and away from the periphery of the other plate, and mechanism driven by the said one plate operable to control the shifted position of the said second roller.

4. In a dual clutch; a rotary housing, a plate on each side of the housing, an element carried by each plate resiliently urged toward driving engagement with the housing, notch means in the periphery of each plate, an arm on each plate connected with the said element of the same plate and overlying the notch means in the plate when the element is in driving position and moving the element out of driving position when shifted to one side of the notch means, a first roller resiliently urged toward the periphery of one of the said plates so as to enter the notch means thereof and automatically unclutch the said plate from the housing, a second roller shiftable toward and away from the periphery of the other plate, and mechanism driven by the said one plate operable to control the shifted position of the said second roller, there being manual means for moving said first roller outwardly from the said one plate to release the associated arm to clutch the said one plate and housing together.

5. In a dual clutch; a rotary housing, a plate on each side of the housing rotatable on the same axis, an element on each plate resiliently urged toward driving engagement with the housing, each plate comprising a pair of notches located at diametrically opposite points on the periphery thereof, an arm pivoted to each plate and connected to the said element thereof, the extreme ends of said arms being positioned over said notches when the elements are in driving position and moving the elements out of driving position when shifted to one side of the notches, a first roller in the plane of one plate, an arm supporting the roller and resiliently urging the roller against the periphery of the plate, an eccentric connected with the said one plate, a shoe around the eccentric, a lever pivoted at one end and connected with said shoe to be rocked between limits thereby, a second roller in the plane of the other of said plates, and means connected with said lever for moving the second roller toward and away from the periphery of said other plate.

6. In a dual clutch; a housing, a clutch plate on each side of the housing, means for connecting one plate with the housing to be driven thereby and for automatically disconnecting the said one plate from the housing when said one plate has made one half revolution, means actuated by the said one plate for drivingly connecting the other plate and housing upon movement of said one plate to a pre-determined position for continued rotation of said other plate while said one plate is in the said pre-determined position, and for disconnecting the said other plate and housing when said one plate is in a different position, and detent means for each plate holding the said plates stationary when disconnected from the housing.

7. In a dual clutch; a housing, a clutch plate on each side of the housing, means for connecting one plate with the housing to be driven thereby and for automatically disconnecting the said one plate from the housing when said one plate has made one half revolution, means actuated by the said one plate for drivingly connecting the other plate and housing upon movement of said one plate to a pre-determined position for continued rotation of said other plate while said one plate is in the said pre-determined position, and for disconnecting the said other plate and housing when said one plate is in a different position, and detent means for each plate holding the said plates stationary when disconnected from the housing, said detent means also comprising the means for disconnecting the plates from the housing.

References Cited in the file of this patent

UNITED STATES PATENTS

| Number | Name | Date |
|---|---|---|
| 638,637 | La Clair | Dec. 5, 1899 |
| 966,586 | Nordquist et al. | Aug. 9, 1910 |
| 1,405,001 | Reichelt | Jan. 31, 1922 |
| 1,463,613 | Davis | July 31, 1923 |
| 1,514,700 | Harris | Nov. 11, 1924 |
| 1,842,059 | Alegria | Jan. 19, 1932 |
| 1,939,974 | Giffin | Dec. 19, 1933 |
| 2,156,362 | Strandlund | May 2, 1939 |
| 2,343,312 | Maurer | Mar. 7, 1944 |
| 2,443,491 | Andres | June 15, 1948 |